United States Patent [19]
Schott et al.

[11] 3,889,781

[45] June 17, 1975

[54] FIXTURE FOR CABLE LUBRICATING DEVICE

[76] Inventors: Roger A. Schott, 13559 Rutland, Detroit, Mich. 48227; Lawrence A. Schott, 15940 Warwick, Detroit, Mich. 48223

[22] Filed: May 4, 1973

[21] Appl. No.: 357,225

[52] U.S. Cl............ 184/15 R; 118/404; 184/105 R
[51] Int. Cl............................................. F16n 11/00
[58] Field of Search................ 184/15 R, 16, 105 R; 118/404, 405, DIG. 18, DIG. 19

[56] References Cited
UNITED STATES PATENTS
| | | | |
|---|---|---|---|
| 2,531,095 | 11/1950 | Williams | 184/16 |
| 3,144,916 | 8/1964 | Lien | 184/15 R |
| 3,283,854 | 11/1966 | Self | 184/105 R |

FOREIGN PATENTS OR APPLICATIONS
| | | | |
|---|---|---|---|
| 257,790 | 9/1926 | United Kingdom | 184/15 R |

Primary Examiner—Manuel A. Antonakas
Attorney, Agent, or Firm—Barnes, Kisselle, Raisch & Choate

[57] ABSTRACT

A fixture for facilitating the lubrication of cables including a housing having a clamping portion and a resilient insert to receive and capture the elongate cable and the end of the cable sheath,, the compressible material being clamped around these portions. A lubricant aperture is provided in the fixture for introducing lubricant under pressure to the cable sheath. The compressible insert in the fixture is designed to be captured in the base of one portion of the fixture and at another point in the moving portion of the fixture to allow it to be opened and closed for insertion and removal of the cable and sheath.

4 Claims, 5 Drawing Figures

PATENTED JUN 17 1975

3,889,781

FIXTURE FOR CABLE LUBRICATING DEVICE

This invention relates to a Fixture for a Cable Lubricating Device. Reference is made to a copending application of Roger A. Schott and Lawrence A. Schott, entitled "Cable Lubricating Device," Ser. No. 341,168, filed Mar. 14, 1973, wherein there is disclosed a device for facilitating the lubrication of sheathed cables.

The present invention has as its object the improvement of a fixture for clamping on to the cable and sheath.

It is an object of the present invention to provide a clamping enclosure for a sheath and cable which can be opened up to receive the elements to be lubricated and then clamped down to provide a closed receptacle for the receipt of lubricant under pressure.

It is a further object to provide a relatively inexpensive lubricating fixture in which the clamping material has a resilient characteristic and is fastened to movable portions of the fixture in such a way that it will open and close with a manual adjustment.

Other objects and features of the invention relate to details of the design and will be apparent in the following description and claims in which the principles of the invention are set forth together with the manner of use in the best mode presently contemplated.

Figure 1:
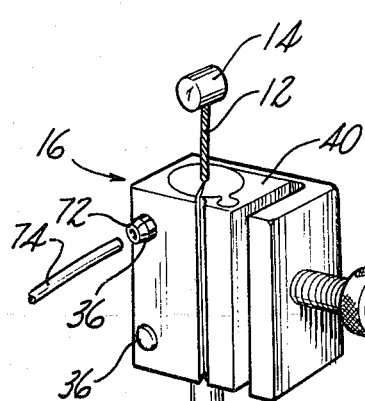

DRAWINGS accompany the disclosure and the various views thereof may be briefly described as:

FIG. 1, a perspective view of the fixture in assembled position.

Figure 2:
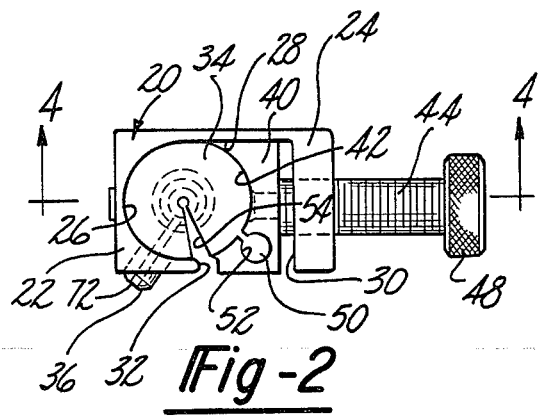

FIG. 2, an end view of the fixture.

Figure 3:
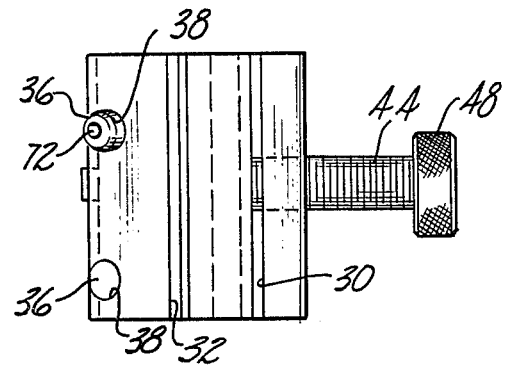

FIG. 3, a side view of the fixture.

Figure 4:
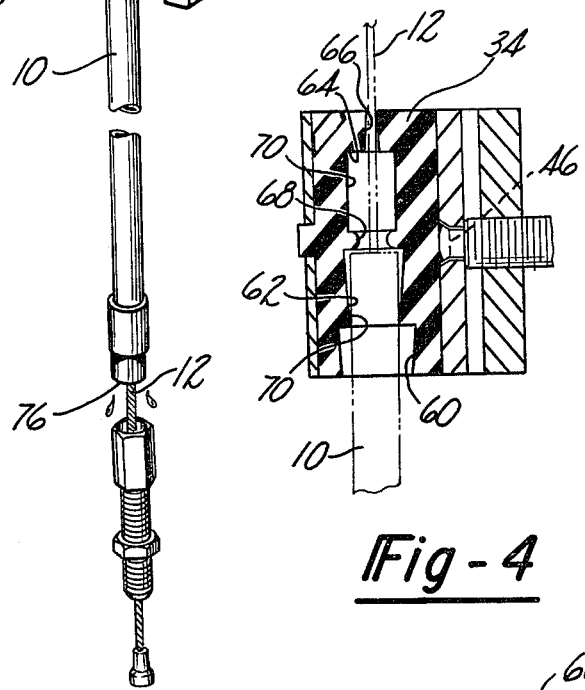

FIG. 4, a sectional view on line 4—4 of FIG. 2.

Figure 5:
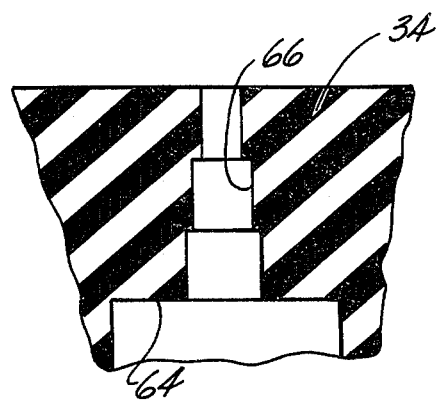

FIG. 5, an enlarged view of the small opening of the compressible insert.

REFERRING TO THE DRAWINGS

In FIG. 1, there is shown a cable sheath 10 which houses a cable 12. The cable may have a fastening lug 14 securely affixed to the end thereof. A fixture 16 is used to capture the end of the sheath and the cable for lubricating purposes. An end view of this fixture is shown in FIG. 2 in which it will be seen that there is an extrusion part forming a body 20 which has a base portion 22 and a capping portion 24.

An internal recess extending through the body terminates in a semi-circular or cylindrical recess 26 at the bottom with a side wall 28 at the back and a top wall 30 at the top. The front of the one body opens to the recess at 32. Seated in the semi-circular portion of the recess is a resilient cylindrical element 34 formed of a compressible oil resistant material relatively soft in nature.

The cylindrical element 34 has two spaced radial protrusions 36 which pass through holes 38 in the forward portion of the body base 22 extending at an angle as illustrated in FIG. 2. These protrusions serve to capture the lower portion of the element in the body. Slidably mounted in the recess within the body 20 is a clamping plate 40 which has a semi-circular curvature on the side 42 which faces the recess and a flat top portion parallel with the surface 30. A headed screw 44 is threaded through the capping portion 24 and has a small projection 46 which is loosely riveted in an opening in the clamp portion 40. This projection will rotate in this clamp so that when the screw is operated by its knurled head 48, the clamp portion 40 will move in the recess of the body 20. The cylindrical portion 34 is formed with an axially extending rib 50 which is retained in an opening 52 in the clamp portion 40 to capture the upper portion of the element. The clamp 40 is stabilized and guided by the back wall 28 of the body as it moves to and from in the recess.

The cylindrical element 34 has an axially extending radial cleavage 54 to an axial bore or cavity within the cylindrical portion. Thus, it will be seen that with one portion of the cylindrical insert 34 captured by the protrusions 36 in the base of the body and another portion of the cylindrical element captured in the recess 52, the motion of the clamping element 40 will cause the resilient member to open and close at the radial cleavage 54. The recess within the compressible element 34 is progressively enlarged axially with two sections 60 and 62 each terminating at a shoulder and entering at one end and terminating at a wall 64, there being a small axial opening 66 at the central portion of the wall 64.

Sections 60 and 62 progressively increase in diameter to a shoulder portion and are connected by a neck portion 68 to the final recess 70. Thus, when a cable sheath 10 is inserted into the side cleavage, it will, depending on its size, fit readily against a shoulder of one of the sections 60–62 and the cable 12 will pass through the small opening 66. Thus, when the clamp element 40 is moved downwardly by the screw 44, the cylindrical element 34 will seal around the sheath at, for example, the point 70 as shown in FIG. 4, and the small opening 66 will seal around the cable 12. One of the protrusions 36 has an opening 72 which leads into the recess portion 70. When the parts are assembled as shown in FIG. 1, a small tube 74 can be inserted in the opening 72 and lubricant under pressure can be introduced into the chamber 70 where it will flow around the cable and into the end of the sheath 10. Continued introduction will cause the lubricant to flow out of the other end of the cable at 76.

Thus, it will be seen that a cable end together with the sheath end can be easily introduced into the fixture after which it can be sealed by the clamping action of the parts and lubricant introduced to flow through the cable sheath around the cable to lubricate the contacting surfaces. The release of the screw 44 will cause an opening of the radial cleavage 54 and permit ready removal of the parts after lubrication.

What is claimed is:

1. A fixture for a cable lubricating device which comprises:
   a. a body portion formed as an extruded part having a base, a side wall, and a cap portion and an internal recess having a curved portion at the base and a relatively flat portion at the top, said recess opening at one side, and one or more locator openings extending radially from said recess,
   b. a resilient insert to lie in said recess against the base having a projection to interfit with a locator opening, said insert having a central bore extending axially thereof to receive the end of a cable sheath and a cable, and an axially extending radial cleavage to said bore,
   c. an axially extending rod-like, integral protrusion along one side of said insert opposite said projection,
   d. a clamping plate in said recess opposite said curved portion to move in said recess toward and away from said insert and having an axially extending recess to capture said rod-like protrusion, and e. means to move said plate to compress said insert and close said insert around an encircled sheath and cable.

2. A fixture as defined in claim 1 in which said bore comprises stepped, aligned recesses of varying diameter each terminating in a shoulder and originating at one end of the insert with the largest recess, and a final cable embracing recess at the end of said stepped recesses extending to the other end of said recess.

3. A fixture as defined in claim 1 in which said projection on said insert is perforated to permit insertion of a lubricant pressure tube, said perforation leading to said central bore.

4. A fixture as defined in claim 1 in which said clamping plate has a curved surface opposed to that of the base to embrace one side of said insert.

* * * * *